March 10, 1970  H. W. JOHNSON  3,499,284
HYDRAULIC CONTROL UNIT
Original Filed July 25, 1967  3 Sheets-Sheet 3
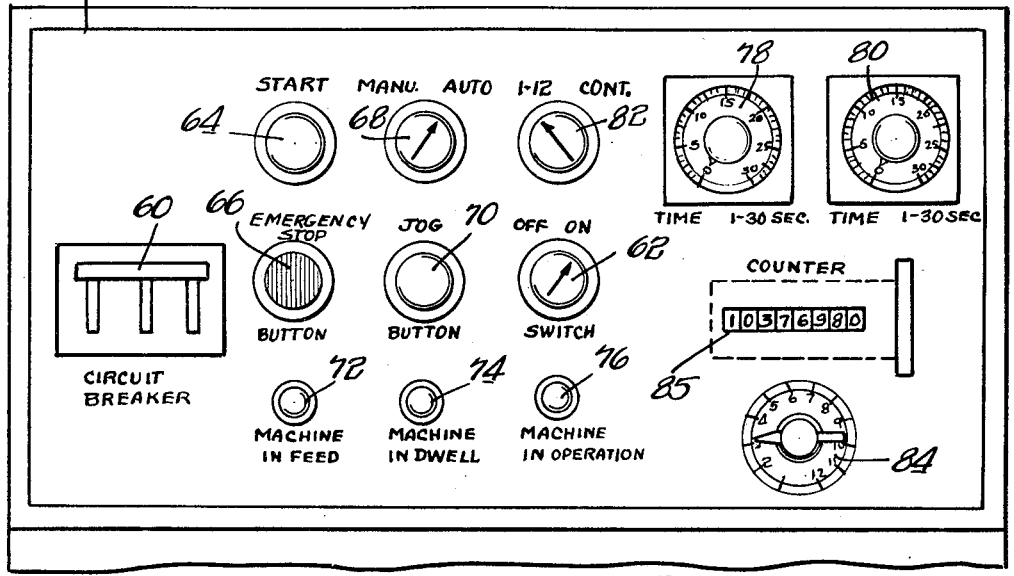
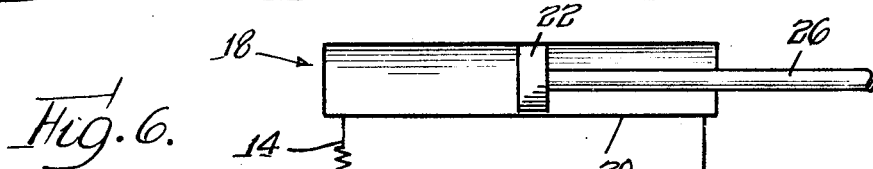
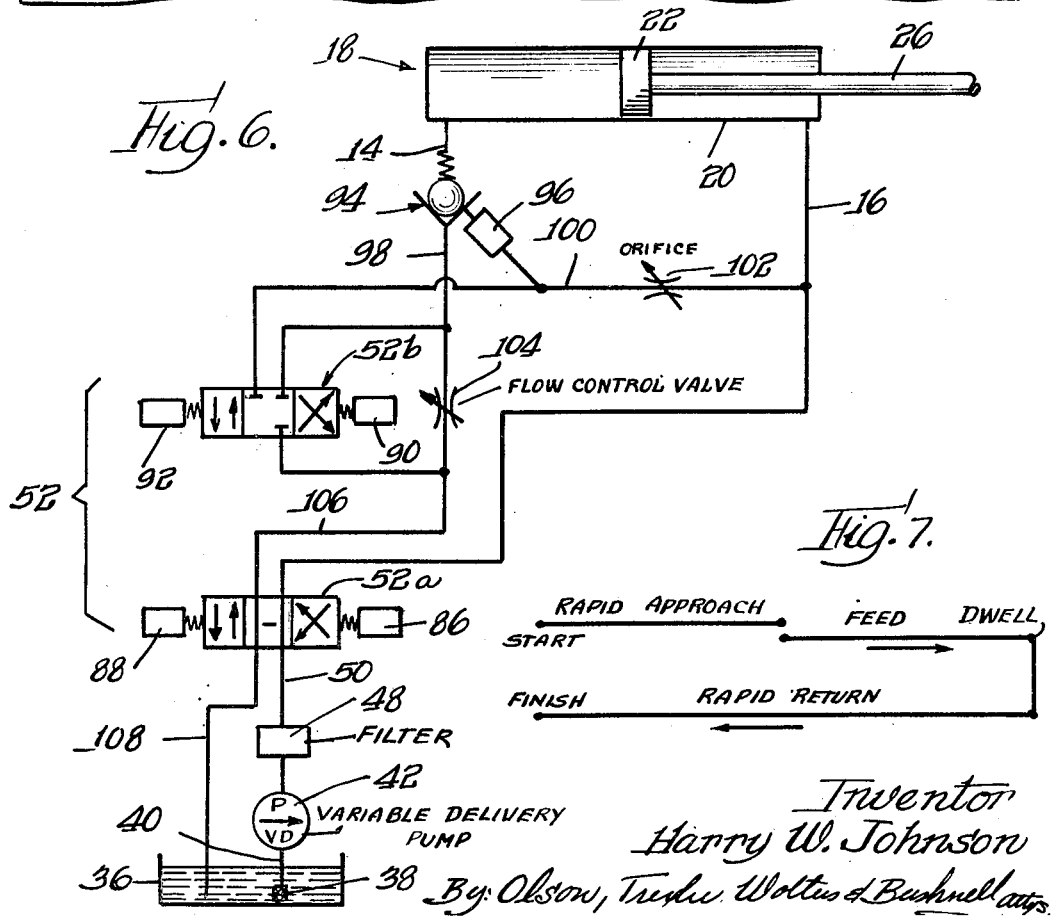
Inventor
Harry W. Johnson
By Olson, Trexler, Wolters & Bushnell attys.

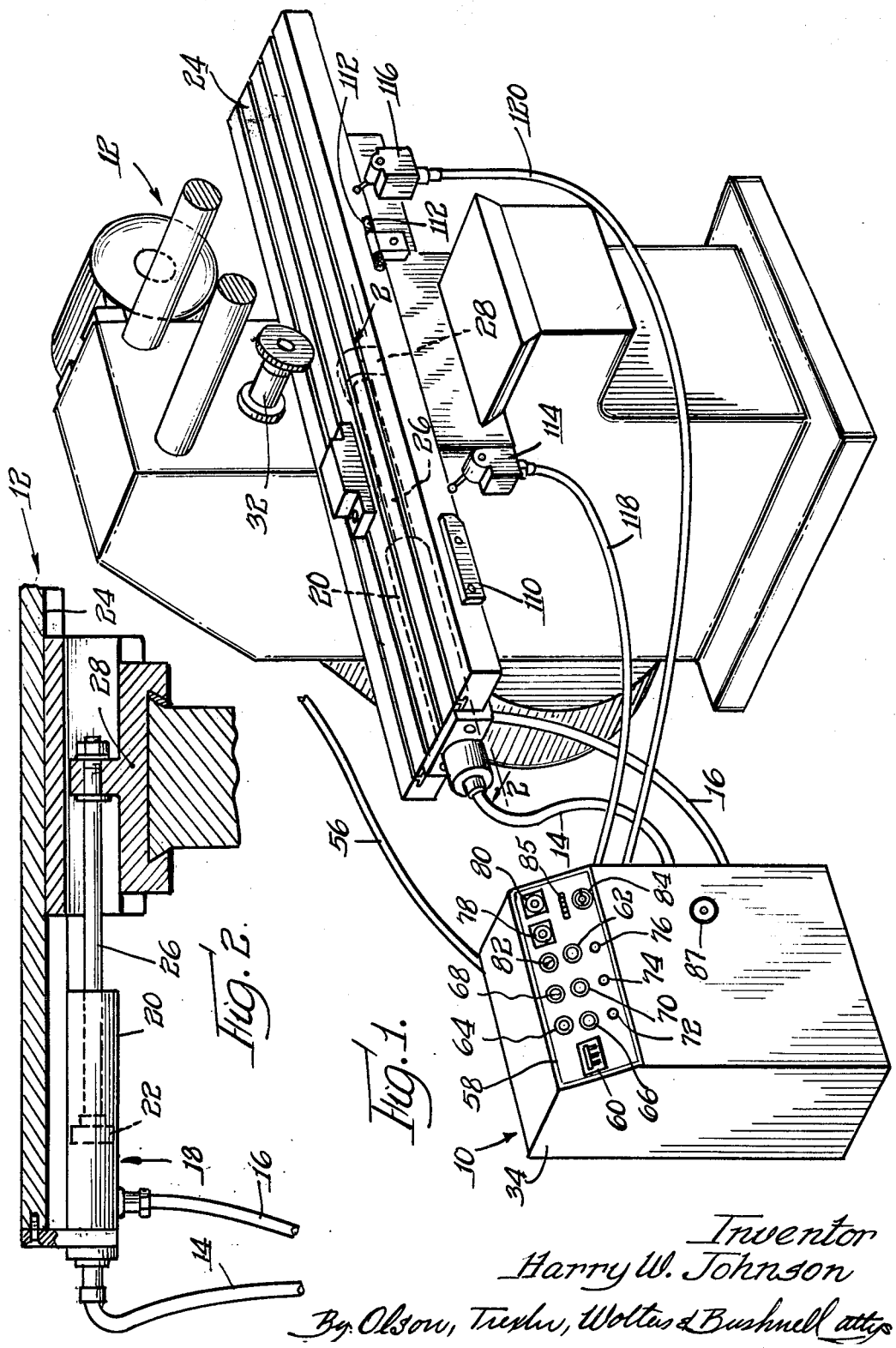

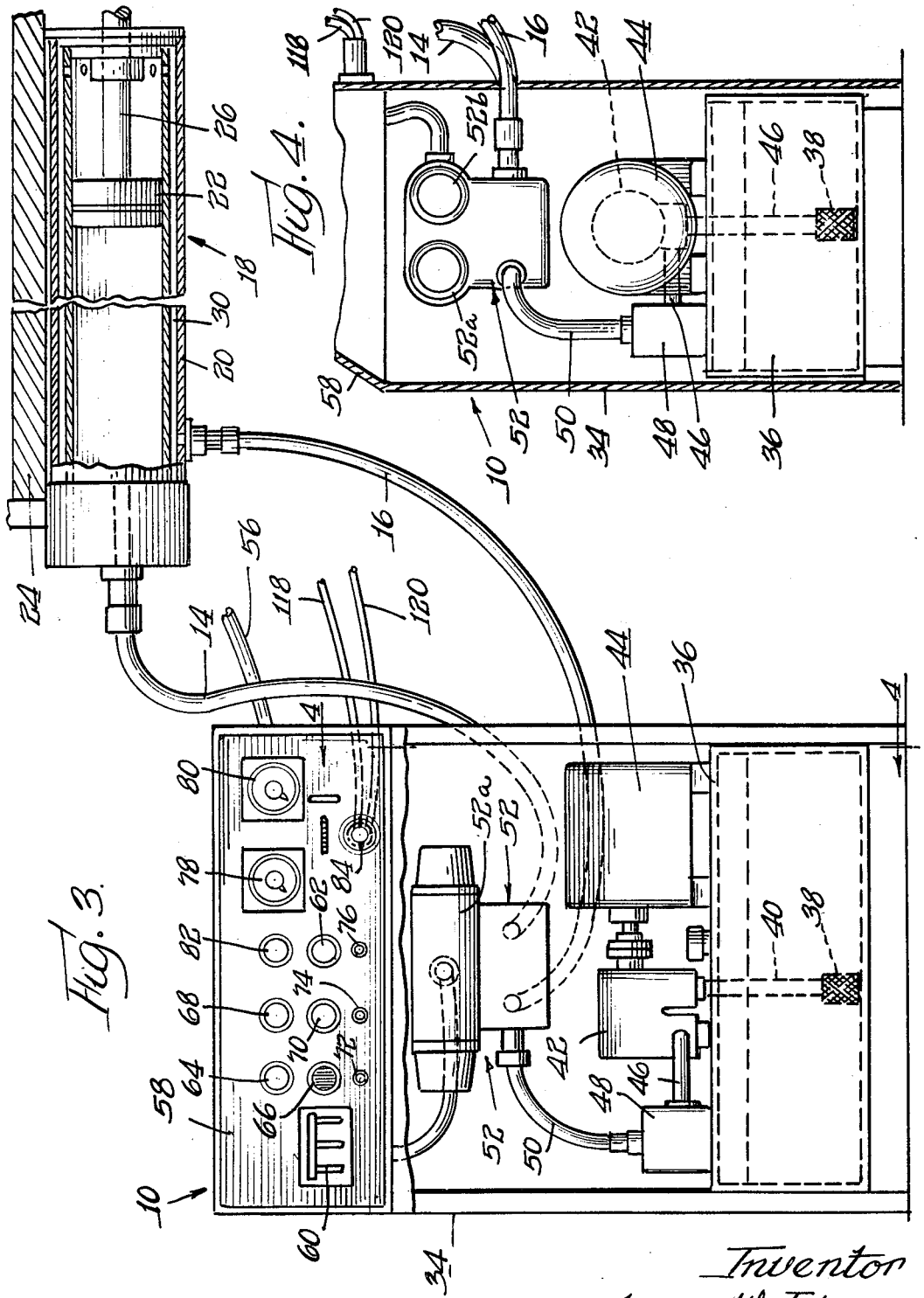

United States Patent Office 3,499,284
Patented Mar. 10, 1970

3,499,284
HYDRAULIC CONTROL UNIT
Harry W. Johnson, 156 W. Washington St.,
West Chicago, Ill. 60185
Continuation of application Ser. No. 655,862, July 25,
1967. This application Apr. 23, 1969, Ser. No. 820,039
Int. Cl. F15b 15/14, 15/18, 15/22
U.S. Cl. 60—52                                     11 Claims

ABSTRACT OF THE DISCLOSURE

The present application discloses a self-contained portable control unit in combination with material working machines, such as machine tools which have been converted from mechanical to hydraulic actuation.

Thus for example, a mechanically actuated milling machine may be converted to hydraulic actuation by replacing the lead screw mechanism with a hydraulic actuator in the form of a cylinder and piston construction. The present invention contemplates provision of a self-contained control unit for use in combination with such a converted milling machine though positioned wholly exteriorly and structurally independent of the milling machine. The compact control unit disclosed herein includes a reservoir, pump means, and hydraulic and electrical circuitry for controlling the speed and direction of fluid flow combined as a single unit within a housing or casing. The aforesaid control unit may be hydraulically coupled with the opposite extremities of the actuator cylinder associated with the converted milling machine.

---

This application is a streamlined continuation of Ser. No. 655,862, filed July 25, 1967 and now abandoned.

DISCLOSURE OF THE INVENTION

The present invention, as mentioned above, is of considerable practical significance in instances where a mechanically actuated machine has been converted to a hydraulically actuated machine. The conversion of a mechanically actuated milling machine, for example, does not entail extensive structural redesigning and hence may be accomplished with a minimum of expense. The problem however is to provide fluid supply, as well as the hydraulic and electrical controls essential to efficient functioning of the hydraulic actuator system without extensive redesigning and reconstruction of the machine per se.

It will be apparent from the foregoing that the present invention is concerned primarily with the provision of a control unit to be coupled with a hydraulic actuator mechanism with minimum expense and effort.

More specifically the present invention contemplates a control unit of the type referred to above which is self-contained and adapted to be positioned wholly externally of the machine with which it is to be used. To this end the present invention contemplates a compactly arranged portable unit containing all of the hydraulic equipment and all of the hydraulic and electrical circuitry essential to the manual or automatic control of the speed and directional movement of a shiftable hydraulic actuator.

The present invention renders it possible and practical for a wide variety of mechanically operated or actuated apparatus such as machine tools and the like to be equipped with hydraulic propulsion and control by the use of the unit referred to above wherein all of the essential hydraulic and electrical mechanism may be housed within a single casing or housing, such housing being adapated for convenient coupling with a conventional hydraulic actuator mechanism.

The foregoing and other objects and advantages will be more apparent from the following detailed description when considered in connection with the accompanying drawings wherein:

FIG. 1 is a perspective view of the control unit of the present invention operatively connected with the hydraulic actuator of a milling machine;

FIG. 2 is an enlarged fragmentary sectional view taken substantially along the line 2—2 of FIG. 1 showing the arrangement of the hydraulic actuator and the milling machine table to which it is connected;

FIG. 3 is a front elevational view of the control unit with the front panel thereof removed to expose parts otherwise hidden, said unit being shown hydraulically coupled with the hydraulic actuator of the milling machine;

FIG. 4 is a fragmentary end elevational view of the self-contained portable control unit, taken substantially along the line 4—4 of FIG. 3;

FIG. 5 is a fragmentary front elevational view of the upper portion of the control unit more clearly to illustrate the position of the various buttons adapted for convenient manual manipulation by an operator;

FIG. 6 is a diagrammatic illustration of a circuit arrangement contemplated by the present invention which may be housed within the control unit, said circuit being shown in association with the hydraulic actuator; and FIG. 7 is a chart depicting the various cycles of machine operation.

Referring now to the drawings wherein like numerals have been employed to designate similar parts throughout the various views, it will be seen that the self-contained compact portable control unit contemplated by the present invention is designated generally by the numeral 10.

FIG. 1 discloses this self-contained control unit 10 hydraulically and electrically connected with a milling machine designated generally by the numeral 12. Conduits 14 and 16 hydraulically connect the unit 10 with a hydraulic actuator 18 consisting of a cylinder 20 and a piston 22. It will be noted in FIG. 2 that the cylinder 20 is mounted on the underside of the milling machine table 24 and is longitudinally movable with said table. The rod 26 of the piston 22 is secured in a fixed position to the cross ride 28 of the machine 12.

A more detailed disclosure of the cylinder and piston arrangement is shown in FIG. 3. The cylinder 20 is double walled so as to provide a longitudinal fluid passage 30. This passage 30 connects the conduit 16 with the chamber on the right side of the piston 22 as viewed in FIG. 3 and the conduit 14 is hydraulically connected with the chamber on the opposite side of the piston 22. In a conventional milling machine such as the machine 12 the table 24 is longitudinally reciprocated beneath a cutter supporting spindle 32. Mechanical actuation of a milling machine table is usually accomplished by a lead screw and nut arrangement positioned beneath the table. To convert this type of mechanical actuating mechanism to a hydraulic system of actuation it is only necessary to replace the lead screw and nut with a piston and cylinder arrangement as previously described. This change may be made very economically without disturbing or altering any other structural portions of the machine.

It has been common practice to provide machine tools such as milling machines with either mechanical or hydraulic actuating mechanisms as original equipment. In such instances the machine is especially designed to employ such actuating mechanisms. Hydraulic actuation has in many instances proved to have certain functional and structural advantages over mechanical actuation but heretofore it has not been economically feasible to change from mechanical to hydraulic actuation and control. The present invention proposes to satisfy the demand in the industry for economical conversion from mechanical to hydraulic actuation and control.

Referring now to the control unit 10, it will be seen that this unit includes a housing or casing 34. At the bottom of the casing 34 is a fluid reservoir 36, FIGS. 3 and 4. Fluid such as oil is drawn from the reservoir 36 through a filter 38 and a conduit 40 to the intake side of a variable displacement pump 42. This pump 42 is driven by an electric motor 44 supported at the upper side of the reservoir 36. Fluid is discharged from the pump 42 through a conduit 46 into a suitable filter 48 and then through a conduit 50 into a valve mechanism designated generally by the numeral 52. The valve 52 is solenoid operated, as will later be described, and is composed of two valve mechanisms. As illustrated diagrammatically in FIG. 6, each of said mechanisms is designated respectively as 52a and 52b. The self-contained unit 10 is connectable with an external source of electrical power supply by a cable 56.

The upper front surface of the housing 34 is inclined rearwardly so as to expose an instrument panel 58 into full view of an operator. This panel, as clearly illustrated in FIG. 5, supports such essential elements as a circuit breaker 60, an off and on switch 62, a conventional start button 64, an emergency stop button 66, a control button 68 for selecting manual or automatic operation, a button 70 whereby the operation of the equipment may be jogged along, a lamp 72 which will be illuminated when the machine operates at the system feed rate of speed, a lamp 74 which illuminates to indicate that the machine is in dwell position, a lamp 76 for indicating that the electric motor and pump are functioning, an instrument 78 for governing the length or period of machine dwell, an instrument 80 for governing the length of return travel, instrument 84 to condition the system for repeat cycles, and instrument 86 for determining the number of repeat cycles.

The control unit 10 is also equipped with a counter 85 which records the completion of each cycle of operation. The rear of the casing or cabinet 34 has provision (not shown) for an impulse outlet which will permit machine set-ups to be made on machine tools which are equipped with solenoid devices such as air clamps, rotary tables, etc. Also, a control member 87 is positioned on the front of the cabinet 34 for regulating the rate of feed.

While the present invention is not limited or primarily directed to a specific hydraulic and electrical system, it should suffice for purposes of illustration to make general reference to the diagrammatic illustration of the circuit arrangement shown in FIG. 6. Actuating fluid is drawn by the variable displacement pump 42 and directed through the filter 48 and conduit 50 to the control valve 52a which forms a part of the valve mechanism heretofore identified generally by the numeral 52. Shifting of the control valve 52a is controlled by a pair of solenoids 86 and 88. Extending between the valve 52a and the hydraulic actuator cylinder is the conduit 16 previously referred to.

The hydraulic circuit of FIG. 6 also includes a valve 52b, which like the valve 52a forms a part of the valve mechanism heretofore designated generally by the numeral 52. Shifting of the valve 52b is also controlled through the agency of a pair of solenoids 90 and 92. It will also be noted that the left side of the actuator cylinder 20 is connected by the conduit 14 to a check valve designated generally by the numeral 94. In order for fluid to flow to or from the left chamber of the actuator cylinder 20 it is necessary that the check valve 94 be open. The opening of the check valve 94 is controlled through the agency of a conventional pilot valve control mechanism 96. Obviously, the check valve 94 will open automatically in response to predetermined pressure in the fluid line 98 but the pilot valve control mechanism 96 functions to open the check valve 94 when it is desired to permit fluid from the left side of the cylinder 20 to flow therefrom. Functioning of the pilot mechanism 96 is controlled by the pressure of fluid in the line or conduit 100. An adjustable restricted orifice mechanism 102 is employed to control the pressure developed within the conduit 100. Likewise, an adjustable orifice mechanism or flow control valve 104 is employed to cause the flow of fluid at a feeding rate into the actuator 20.

Thus, for example, if it is required to move the actuator piston 22 to the left at rapid rate, or what is sometimes referred to as rapid approach, solenoids 88 and 92 will be energized so as to position their respective valves 52a and 52b so as to allow fluid to pass through the conduit 16 into the cylinder 20 at a rapid rate of speed. The valve 52b through the action of the solenoid 92 blocks the exit of fluid from the line 100 and the variable restricted orifice mechanism 102 causes sufficient pressure to develop within the line 100 to actuate the pilot mechanism 96 and this serves to open the check valve 94. This permits fluid from the advancing side of the piston 22 to pass through the conduit 14, the check valve 94, the conduit 98 and flow control valve mechanism 104. The restricted orifice within the flow control valve sets up a predetermined back pressure on the advancing side of the piston 22. Fluid from the flow control valve 104 passes through a conduit 106 and the valve 52a, and is returned through a conduit 108 to the fluid reservoir 36. At a predetermined period in the cycle of rapid approach the valve may again be shifted to condition the circuit for feeding rate of movement and upon the completion of the advancing stroke a predetermined dwell may occur before the actuator piston 22 is moved at a rapid return rate.

In FIG. 7 one complete cycle of operation is diagrammatically illustrated. Thus, the hydraulic actuator is initially moved at rapid approach speed followed by a feeding speed over a length dependent upon the extent of the workpiece, this speed terminating in a period of dwell followed by a rapid return. Dogs 110 and 112 carried by the table 24 of the milling machine cooperate in the usual fashion with conventional limit switches 114 and 116 in determining the overall length of travel of the cable. The limit switches 114 and 116 are connected by suitable cables 118 and 120 with the mechanism housed within the cabinet.

From the foregoing it will be apparent that the present invention contemplates a very practical, compact, self-contained portable unit which lends itself for convenient coupling with a hydraulic actuator. Obviously, the hydraulic actuator is not limited to the details of construction illustrated herein. The control unit of the present invention makes it possible for a machine to be conditioned for hydraulic actuation; thus presenting all of the advantages resulting from this type of propulsion. The infinite and accurate variation in the speed of operation, as well as the extreme accuracy in extent of travel and period of travel of dwell which hydraulic actuation affords, may be obtained when the present invention is employed. It should also be understood that the present invention is not limited to the specific structural arrangement herein described but contemplates other changes and modifications without departing from the spirit and scope of the appended claims.

I claim:
1. In combination with a material working machine having a reciprocable machine element actuated by piston and cylinder hydraulic actuator means; a self-contained, portable control unit, said unit including a housing capable of being positioned externally of said machine, said housing accommodating a fluid reservoir, pump means for receiving fluid from said reservoir, an electric motor for driving said pump means, means for controlling the speed and directional fluid flow between said pump means and a point externally of said housing, said speed and directional control means including both hydraulic and elec- trical circuitries, means for hydraulically coupling said unit with said piston and cylinder hydraulic actuator means, and switch operating means associated with said housing in a position for convenient manual manipulation.

2. The combination as set forth in claim 1 wherein said self-contained control unit is provided with hydraulic circuitry which includes fluid directing means for coupling said hydraulic circuitry with opposite extremities of said hydraulic actuator cylinder.

3. The combination as set forth in claim 1 wherein the hydraulic circuitry of said self-contained control unit includes restricted orifice means for determining speed of fluid flow.

4. The combination as set forth in claim 1 wherein the means for controlling the speed and directional flow of fluid received from the pump includes shiftable valve mechanisms.

5. The combination as set forth in claim 1 wherein said self-contained control unit includes a shiftable valve means having check valve mechanism within the hydraulic circuit for governing fluid flow to or from a hydraulic actuator cylinder of the material working machine.

6. The combination as set forth in claim 1 wherein said self-contained control unit includes check valve means and hydraulic control means for governing the functioning of said check valve means.

7. The combination as set forth in claim 1 wherein the electrical circuitry of said self-contained control unit includes solenoid mechanism for actuating said directional fluid flow control means.

8. The combination as set forth in claim 1, wherein the fluid reservoir of said self-contained control unit is located at the bottom of the housing thereof.

9. The combination as set forth in claim 1 wherein the electric motor and pump means of said self-contained unit are positioned immediately above said fluid reservoir.

10. The combination as set forth in claim 1 wherein the electric motor is positioned immediately above the fluid reservoir and the means for controlling the speed and direction of fluid flow is positioned above the pump means and electric motor.

11. The combination as set forth in claim 1 wherein the material working machine comprises a milling machine having a reciprocable table adapted to be hydraulically shifted.

References Cited

UNITED STATES PATENTS

| | | |
|---|---|---|
| 1,993,612 | 3/1935 | Lum. |
| 2,330,739 | 9/1943 | Piron. |
| 2,365,536 | 12/1944 | Fischer et al. |
| 2,984,985 | 5/1961 | MacMillin. |
| 3,213,605 | 10/1965 | Welden. |

FOREIGN PATENTS 204,869  8/1959  Austria.

EDGAR W. GEOGHEGAN, Primary Examiner